(No Model.)
J. W. MARSHALL.
METALLIC WHEEL.
No. 315,805. Patented Apr. 14, 1885.
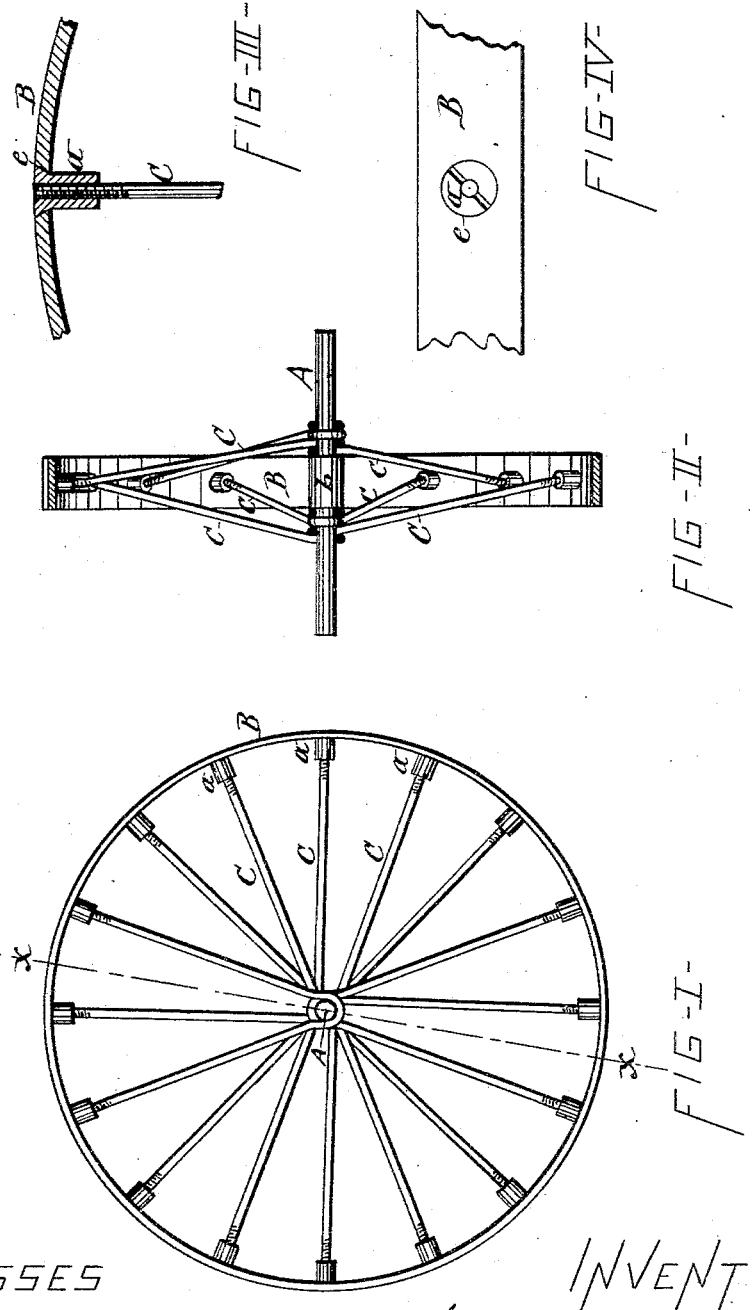

UNITED STATES PATENT OFFICE.

JUSTICE W. MARSHALL, OF CAZENOVIA, NEW YORK.

METALLIC WHEEL.

SPECIFICATION forming part of Letters Patent No. 315,805, dated April 14, 1885.

Application filed November 28, 1884. (No model.)

*To all whom it may concern:*

Be it known that I, JUSTICE W. MARSHALL, of Cazenovia, in the county of Madison, in the State of New York, have invented new and useful Improvements in Metallic Wheels, of which the following, taken in connection with the accompanying drawings, is a full, clear, and exact description.

This invention consists in a novel, simple, and comparatively inexpensive construction and combination of the constituent parts of a metallic wheel having its spokes formed in pairs of a continuous rod lapped at its center around the axle and screw-threaded at both ends and adjustably connected with the felly, all as hereinafter more fully described, and specifically set forth in the claim.

In the annexed drawings, Figure I is a side elevation of my improved wheel. Fig. II is a transverse section on line $xx$, Fig. I, and Figs. III and IV are enlarged sectional and plan views of the connection of the spoke with the felly or tire of the wheel.

Like letters of reference denote like parts in all the figures.

A represents the axle on which the wheel is mounted. B denotes the felly or tire, and C C the spokes. Said spokes are arranged in pairs extended divergent from the felly or tire to the center of the plane of the wheel, and each pair of spokes is formed of a continuous rod, the central portion of which is lapped around the axle A, and the two extremities of said rod are screw-threaded and enter female threaded thimbles $a\ a$, which are pivoted in eyes $e\ e$ in the felly or tire B, and are headed and countersunk at the exterior of the felly or tire, so as to obtain a firm hold thereon, as illustrated in Fig. III of the drawings. The head of the thimble is provided with a transverse slot for the application of a screw-driver for turning said thimble, by which latter operation the spoke can be drawn toward the felly or tire, and thus adjusted to the requisite tension. I do not, however, limit myself to the aforesaid slot, as it is obvious that the thimble may be turned by means of a pipe-wrench applied to the shank of the thimble, or by making said shank polygonal for the application of an ordinary wrench. The spokes are spread apart or made to diverge at the center of the plane of the wheel by means of a collar or sleeve, $b$, applied to the axle between the successive pairs of spokes, as shown in Fig. II of the drawings.

It will be observed that by the aforesaid arrangement of parts the spokes receive a direct and positive hold on the axle, and their connection with the axle is of the utmost simplicity, requiring no hub, but simply a spreader, which is in the form of a plain sleeve or collar slipped on the axle and secured in any suitable and well-known manner.

Having described my invention, what I claim as new is—

In combination with the felly and axle, spokes formed in pairs of a continuous rod lapped at its center around the axle and screw-threaded at both ends, and two screw-threaded thimbles pivoted in the felly and screwed onto the two ends of the aforesaid rod, substantially as described and shown.

In testimony whereof I have hereunto signed my name and affixed my seal, in the presence of two attesting witnesses, at Syracuse, in the county of Onondaga, in the State of New York, this 17th day of June, 1884.

JUSTICE W. MARSHALL. [L. S.]

Witnesses:
    FREDERICK H. GIBBS,
    C. BENDIXON.